(12) United States Patent
Kazmi et al.

(10) Patent No.: US 9,025,477 B2
(45) Date of Patent: May 5, 2015

(54) METHODS AND DEVICES FOR UPLINK DIVERSITY TRANSMISSION

(75) Inventors: Muhammad Kazmi, Bromma (SE); Johan Bergman, Stockholm (SE); Oskar Drugge, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 47 days.

(21) Appl. No.: 13/499,957

(22) PCT Filed: Oct. 4, 2010

(86) PCT No.: PCT/SE2010/051067
§ 371 (c)(1),
(2), (4) Date: Apr. 3, 2012

(87) PCT Pub. No.: WO2011/043720
PCT Pub. Date: Apr. 14, 2011

(65) Prior Publication Data
US 2012/0195224 A1    Aug. 2, 2012

Related U.S. Application Data

(60) Provisional application No. 61/250,063, filed on Oct. 9, 2009.

(51) Int. Cl.
*H04L 12/26* (2006.01)
*H04B 7/06* (2006.01)
(Continued)

(52) U.S. Cl.
CPC ............ *H04B 7/0691* (2013.01); *H04B 7/0404* (2013.01); *H04B 7/0689* (2013.01); *H04W 52/241* (2013.01); *H04W 52/42* (2013.01)

(58) Field of Classification Search
CPC ...................................................... H04L 47/10
USPC ........................................ 370/252, 328–332
See application file for complete search history.

(56) References Cited

U.S. PATENT DOCUMENTS 8,014,812 B2 * 9/2011 Malkamaki ................... 455/522
2004/0147234 A1   7/2004 Lin et al.
(Continued)

FOREIGN PATENT DOCUMENTS

CN          101124743 A      2/2008
JP          11284569 A       10/1999
(Continued)

OTHER PUBLICATIONS

3rd Generation Partnership Project. "Uplink Tx Diversity for HSPA." 3GPP Work Item Description, RP-090987, Sep. 2009.
(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

Methods and devices are provided wherein a user equipment transmits using at least two uplink transmit antennas and receives a set of control signals in the downlink direction from a cellular network. The user equipment estimates a received signal quality for each control signal in said set of control signals and determines, based on said received signal quality, which control signals that have been reliably received. The user equipment derives one or more parameters related to the uplink transmit diversity operation using a subset of control signals from the set of control signals, said subset only including control signals determined as reliably received; and transmits in the uplink direction applying the derived one or more parameters to control the uplink transmit diversity operation. The accuracy of the transmit diversity parameter values derived/set by the UE can be improved. This will enhance the performance of the uplink transmit diversity and will also reduce interference to the neighbor cells.

22 Claims, 3 Drawing Sheets

(51) Int. Cl.
*H04B 7/04* (2006.01)
*H04W 52/24* (2009.01)
*H04W 52/42* (2009.01)

(56) References Cited

U.S. PATENT DOCUMENTS

| | | | |
|---|---|---|---|
| 2008/0051406 A1* | 2/2008 | Graham et al. | 514/249 |
| 2008/0123768 A1 | 5/2008 | Harel et al. | |
| 2009/0016372 A1* | 1/2009 | Tao et al. | 370/437 |
| 2009/0086682 A1* | 4/2009 | Kazmi et al. | 370/335 |
| 2010/0080136 A1* | 4/2010 | Hunzinger | 370/252 |
| 2010/0329370 A1* | 12/2010 | Hochwald et al. | 375/260 |
| 2012/0087401 A1* | 4/2012 | Bhattad et al. | 375/224 |
| 2012/0149424 A1* | 6/2012 | Dawid et al. | 455/522 |

FOREIGN PATENT DOCUMENTS

| | | |
|---|---|---|
| JP | 2005236368 A | 9/2005 |
| WO | 00/72464 A1 | 11/2000 |
| WO | 0072464 A1 | 11/2000 |
| WO | 0191318 A1 | 11/2001 |
| WO | 2004/030229 A2 | 4/2004 |
| WO | 2006/019263 A2 | 2/2006 |
| WO | 2008/097042 A2 | 8/2008 |
| WO | 2008/113025 A1 | 9/2008 |
| WO | 2009099844 A1 | 8/2009 |
| WO | 2009113559 A2 | 9/2009 |

OTHER PUBLICATIONS

3rd Generation Partnership Project. "Anaylsis of UE Transmitter Characteristics due to Switched Antenna Uplink Transmit Diversity in HSPA." 3GPP TSG-RAN WG4 Meeting #52, R4-092908, Shenzhen, China, Aug. 24-28, 2009.

3rd Generation Partnership Project. "Anaylsis of UE Transmit Modulation due to Uplink Beamforming Transmit Diversity in HSPA." 3GPP TSG-RAN WG4 Meeting #51, R4-091920, San Francisco, CA, USA, May 4-8, 2009.

3rd Generation Partnership Project. "Closed Loop Mobile Transmit Diversity." 3GPP TSG-RAN WG1 #48, R1-070692, St. Louis, MO, USA, Feb. 12-16, 2007.

Hottinen, A. et al. "Transmit Diversity using Filtered Feedback Weights in the FDD/WCDMA System." 2000 International Zurich Seminar on Broadband Communications, Nokia Research Center, pp. 15-21, 2000.

\* cited by examiner

METHODS AND DEVICES FOR UPLINK DIVERSITY TRANSMISSION

TECHNICAL FIELD

The present invention relates to methods and devices for controlling uplink diversity transmission in a radio system.

BACKGROUND

A study item called 'Uplink transmit diversity for HSPA', see RP-090987, has recently been completed in 3GPP. The objective of the study item was to perform the feasibility study to evaluate the system gain of uplink transmit diversity schemes for High Speed Packet Access (HSPA) as well as analyze the impact on the User equipment (UE) and base station implementation and complexity in a cellular radio system.

The baseline and typical UE implementation comprises a single uplink transmit antenna used for all types of uplink transmission. However, high end UEs may have and use multiple uplink transmit antennas for uplink transmission. This is commonly referred to as uplink transmit diversity. The objective of the transmit diversity transmission is to achieve higher uplink data rate and/or lower UE transmission power by the virtue of spatial, angular and/or temporal diversities.

A commonly used uplink transmit diversity consists of two uplink transmit antennas. The signals from two or more uplink transmit diversity antennas may be transmitted in different manner in terms of their phases, amplitude, power etc. This gives rise to different uplink transmit diversity schemes. Some well known schemes are:

Transmit beamforming open loop
Transmit beamforming closed loop
Switched antenna uplink transmit diversity open loop
Switched antenna uplink transmit diversity closed loop
Space time transmit diversity Typically, in any transmit diversity scheme, a set of parameters related to uplink transmit diversity are regularly adjusted by the UE. The objective is to ensure that the uplink transmission incorporates the desired spatial, temporal or angular diversities. This in turns improves uplink coverage, reduces interference, increases uplink bit rate and enables UE to lower its transmitted power.

The transmit diversity parameters may comprise of one or many of: relative phase, relative amplitude, relative power, relative frequency, timing, absolute or total power of signals transmitted on transmit diversity branches, etc.

The adjustment of all or a sub-set of these parameters is fundamental to transmit beamforming scheme. The objective of beamforming is to direct the uplink transmission or beam towards the desired base station, which is generally the serving base station. This allows the serving base station to decode the received signal more easily. Furthermore, high directivity of the beam towards the desired base station reduces the interference towards the neighboring base stations.

Similarly in case of switched antenna transmit diversity, transmit diversity parameter implies the selection of the most appropriate transmit antenna (e.g. in terms of radio condition) out of the available transmit diversity branches. By the virtue of using the most appropriate antenna for the uplink transmission, the UE can either reduce its power while retaining a given uplink information rate, or increase the information rate while retaining a given output power.

In open loop transmit diversity schemes, the UE autonomously adjusts the uplink transmit diversity parameters without the use of any network transmitted control signaling or commands. These schemes are simpler, although they may not show substantial gain in all scenarios.

On the other hand in closed loop transmit diversity schemes, the UE adjusts the uplink transmit diversity parameters by making use of a suitable network transmitted control signaling or commands. These commands or control signals reflect the uplink quality e.g. the quality measured at the base station. These commands (control signals) are signaled to the UE over the downlink. Furthermore, the commands can be sent exclusively to the UE to enable it to adjust the uplink transmit diversity parameters. Alternatively the UE can utilize any existing commands or signaling, which are originally intended for other purposes, to derive the uplink transmit diversity parameters. Examples of such implicit signaling or commands are transmit power control (TPC) commands and Hybrid Automatic Repeat Request (HARQ) Acknowledgement/Negative Acknowledgement (ACK/NACK) etc which are sent to the UE by the base station for uplink power control and uplink HARQ retransmission scheme respectively. The closed loop schemes have a potential of leading to a better performance gain due to the use of network controlled signaling for adjusting the uplink transmit diversity parameters.

Furthermore transmit diversity schemes can be used in any cellular radio system technology including Long Term Evolution (LTE), Wideband Code Division Multiple Access (WCDMA) or Global System for Mobile Communication (GSM). For instance in LTE, the switched antenna uplink transmit diversity is standardized in LTE release 8.

Reliability is particularly important in transmissions where an entire decision relies upon one or more simple commands such as on/off signaling, ACK and NACK responses, up and down power control commands, etc. Unreliable commands may cause actions to occur in reverse direction and in some cases may lead to unstable behavior.

The unreliability generally occurs due to bad radio conditions, low transmitted power level, poor coverage, high system load etc whereby the receiver cannot properly interpret the correct meaning of the command.

To ensure reliable operation, four sets of functionalities can be specified:

Reliability check
Behavior or action of UE and/or base station
Indication or reporting of unreliability events to network
Prevention of unreliability The reliability check can be based either on some signal strength or quality such as signal to interference ratio (SIR). It can also be based on some bit error rate (BER) target value. This means a received command is regarded as unreliable in case the received signal quality or strength falls between the thresholds or if the BER is higher than the target.

The behavior of UE or base station in response to unreliable command detection depends upon a particular functionality governed by the on/off command.

A number of uplink transmit diversity schemes exists which use network control signaling or commands to derive the uplink transmit diversity parameters. For instance certain schemes such as uplink transmit beamforming could make use of TPC commands or HARQ ACK/NACK sent by the base station to derive the uplink transmit diversity parameters. Similarly the switched antenna uplink transmit diversity scheme could make use of TPC commands or HARQ ACK/NACK for the antenna selection. Both these schemes have been studied within the scope of the recently completed study item in 3GPP, see RP-090987.

The above signaling (TPC or HARQ ACK/NACK or the like), which are transmitted on the downlink, are used to characterize the uplink quality. However due to poor downlink quality the commands or network signaling such as TPC can be erroneously received by the UE. For instance due to error the TPC, which is either 0 (e.g. DOWN) or 1 (e.g. UP), if transmitted as 1 can be interpreted as 0 or vice versa. This will lead to erroneous adjustment of transmit diversity parameters in case TPC (or similar commands or signaling) is used for this purpose. The erroneous adjustment of parameters may lead to incorrect beamforming or antenna switching. For instance the beam may be directed to the neighbor base station instead of the serving one. The uplink performance (i.e. UE with erroneous parameter setting due to incorrect received command) will deteriorate and the neighboring cells will receive excessive and unnecessary interference.

Further, US patent application No. 2008/123768 describes a system where TPC and HARQ indicator (ACK/NACK) for setting weighting of signals between the 2 transmit antennas. The HARQ quality indicator is not used when NACK is received.

The downlink quality varies with the radio conditions and particularly deteriorates for UEs which are close to the cell border or when the downlink load is high. Especially when being close to the cell border the UE is generally closer to the neighboring base stations and far from the serving one. Hence, the erroneously received commands (control signals), which cause incorrect setting of the uplink diversity parameters for the uplink transmit diversity transmission, will lead to even more substantial interference and lower performance.

It is therefore important to develop methods and arrangements, which can ensure that the values of the uplink transmit diversity parameters are correctly derived.

SUMMARY

It is an object of the present invention to provide an improved method and device to address the problems as outlined above.

This object and others are obtained by the methods and devices as set out in the appended claims.

In accordance with one embodiment a method in a user equipment for controlling uplink transmit diversity operation is provided. The user equipment transmits using at least two uplink transmit antennas and receives a set of control signals in the downlink direction from a cellular network. The user equipment estimates a received signal quality for each control signal in said set of control signals and determines, based on said received signal quality, which control signals that have been reliably received. The user equipment derives one or more parameters related to the uplink transmit diversity operation using a subset of control signals from the set of control signals, said subset only including control signals determined as reliably received; and transmits in the uplink direction applying the derived one or more parameters to control the uplink transmit diversity operation. The accuracy of the transmit diversity parameter values derived/set by the UE can be improved. This will enhance the performance of the uplink transmit diversity and will also reduce interference to the neighbor cells.

In accordance with one embodiment the control signals includes one or more types of the following control signals: transmit power control commands sent to the user equipment for controlling uplink transmit power of the user equipment; Hybrid Automatic Repeat Request, HARQ, Acknowledgement/Negative Acknowledgement, ACK/NACK, signals sent to the user equipment for controlling HARQ retransmissions by the user equipment;

control signals for explicit control of the user equipment transmit diversity parameters.

In accordance with one embodiment, the received signal quality is estimated based on one or more out of:
Signal to interference ratio, SIR,
Signal to interference plus noise ratio SINR,
bit error rate;
block error rate;
service data unit (SDU) error rate;
frame error rate;
symbol error rate.

In accordance with one embodiment the set of control signals are all received on a single radio link.

In accordance with one embodiment the set of control signals are received on multiple radio links.

In accordance with one embodiment the one or more parameters comprise one or more of the following:
relative phase;
relative power;
relative frequency;
timing;
relative amplitude;
absolute power;
of signals transmitted on transmit diversity branches.

In accordance with one embodiment the uplink transmit diversity operation is transmit diversity beamforming and the one or more parameters comprise relative phase and amplitude of signals transmitted on transmit diversity branches.

In accordance with one embodiment the uplink transmit diversity operation is switched antenna uplink transmit diversity and the one or more parameters comprise amplitude or power of signals transmitted on transmit diversity branches.

In accordance with one embodiment if no control signal in said set of control signals is determined as reliably received, the user equipment performs uplink transmissions using less than all transmit antennas in said set of at least two uplink transmit antennas.

In accordance with one embodiment if no control signal in said set of control signals is determined as reliably received, the user equipment switches to a single transmit antenna transmission mode in which uplink transmissions are performed using a single antenna in said set of at least two uplink transmit antennas.

In accordance with one embodiment if the set of control signals consists of a number of N control signals out of which less than a number of M control signals are determined as reliably received, M<N, the user equipment performs uplink transmissions using less than all transmit antennas in said set of at least two uplink antennas.

In accordance with one embodiment if the set of control signals consists of a number of N control signals out of which less than a number of M control signals are determined as reliably received, M<N, the user equipment switches to a single transmit antenna transmission mode in which uplink transmissions are performed using a single antenna in said set of at least two uplink transmit antennas.

According to one embodiment, a method in a user equipment (UE) is provided for controlling uplink transmit diversity operation according to which the UE transmits using at least two uplink transmit antennas. A set of control signals is received in the downlink direction by the UE from a cellular network. The UE estimates received signal quality for each control signal in said set of control signals and determines, based on said received signal quality, which control signals have been reliably received. The UE derives one or more parameters related to the uplink transmit diversity operation using a subset of control signals from said set of control signals, said subset only including control signals determined as reliably received. The UE transmits in the uplink direction while applying the derived one or more parameters to control the uplink transmit diversity operation.

According to one embodiment a method in a cellular network is provided for interacting with a UE performing uplink transmission using an uplink transmit diversity operation scheme. The cellular network transmits a command signal to the UE, said command signal ordering the UE to report to the network when the UE for a defined period of time has failed to appropriately derive one or more parameters related to the uplink transmit diversity operation from control signals received by the UE in the downlink direction from the network. The failure to appropriately derive said parameters being due to low signal quality of said control signals as received by the UE. The cellular network further receives a report from the UE that it has failed to appropriately derive one or more parameters related to the uplink transmit diversity operation for the defined period of time.

According to one embodiment, a method in a cellular network is provided for interacting with a UE performing uplink transmission using an uplink transmit diversity operation scheme. The cellular network (and in particular one or more base stations) monitors uplink transmissions from the UE for detecting events indicating that the UE potentially have failed to appropriately derive one or more parameters related to the uplink transmit diversity operation from control signals received by the UE in the downlink direction from the network.

Embodiments can include different methods in UE and network as well as respective apparatuses (UE and network nodes such as radio base stations) configured to, i.e. comprising means adapted to, implement these different methods.

The invention also extends to User Equipments arranged to control uplink transmission in accordance with the above methods. To enable the User Equipment to perform uplink transmission in accordance with the above methods, the user equipment can be provided with a controller (or several controllers) having circuitry arranged to perform the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

The invention is applicable to a UE, alternatively referred to as a mobile station, which is capable of transmitting any type of signal such as data, control information, higher or lower layer signaling etc, using more than one transmit antenna. This capability is generally called 'uplink transmit diversity'. A typical uplink transmit diversity implementation may comprise two transmit antennas. However, the implementation is not limited to two antennas; it may comprise more than two antennas. One of the antennas may be regarded as the primary antenna, which corresponds to the baseline configuration, which typically comprises a single transmit antenna. The remaining transmit antennas can be regarded as the secondary antennas corresponding to more advanced antenna configurations.

Figure 1:
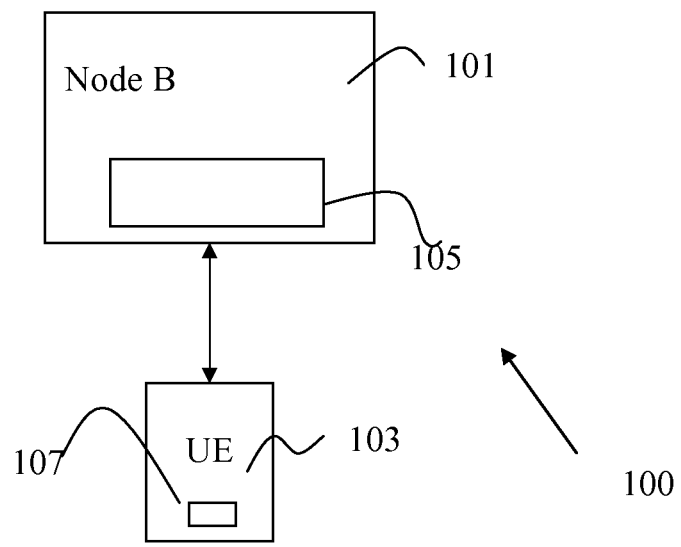
FIG. 1 is a general view of a cellular radio system.

In FIG. 1 a general view of a cellular radio system 100 is depicted. The system 100 depicted in FIG. 1 is a WCDMA system and uses terminology associated with WCDMA system. It is however understood that the invention is applicable to any type of cellular radio system such as GSM, LTE and other similar systems. The system 100 comprises a number of base stations 101, whereof only one is shown for reasons of simplicity. The base station 101 can connect to user equipments in the figure represented by the UE 103 located in the area served by the base station 101. The system 100 is arranged to allow the use of uplink transmit diversity schemes. The base station and the user equipment further comprise controller(s) or controller circuitry 105 and 107 for providing functionality associated with the respective entities. The controllers 105 and 107 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Figure 2:
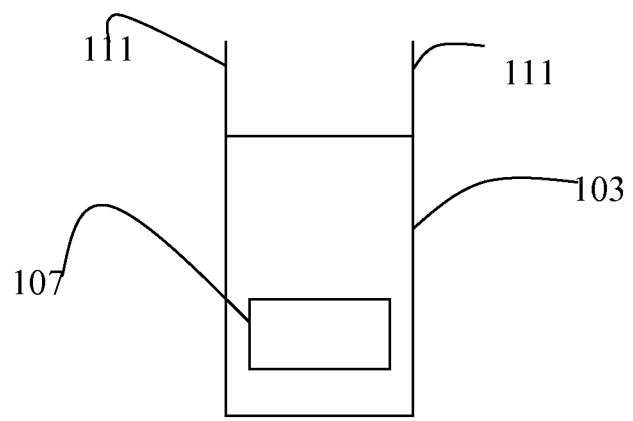
FIG. 2 is a view of a user equipment.

In FIG. 2 a user equipment 103 adapted to transmit in the uplink using a diversity transmission scheme. The user equipment 103 comprises a number of transmit antennas 111 whereof two are shown for reasons of simplicity. It is understood that the user equipment can comprise any number of transmit antennas. The antennas are shown to illustrate that the user equipment is capable of uplink transmit diversity. As described above the user equipment 103 further comprises one or many controllers or controller circuitry 107 to enable the user equipment to implement the uplink diversity transmit methods as described herein.

In accordance with one embodiment the UE adjusts one or more parameters related to the uplink transmit diversity in order for it to adequately transmit on the uplink using transmit diversity. The transmit diversity parameter may comprise one or more of the following: relative phase, relative amplitude, relative power, relative frequency, timing, absolute or total power of signals transmitted on transmit diversity branches, etc. Relative phase may comprise of the phase difference between the phase of the signal transmitted from the first transmit antenna and the phase of the signal transmitted from the second antenna or vice versa. Relative power in dB scale may comprise of the power difference between the power of the signal transmitted from the first transmit antenna and the power of the signal transmitted from the second antenna or vice versa. Relative amplitude in dB may comprise of the amplitude difference between the amplitude of the signal transmitted from the first transmit antenna and the amplitude of the signal transmitted from the second antenna or vice versa. Relative frequency may comprise of the frequency difference between the frequency of the signal transmitted from the first transmit antenna and the frequency of the signal transmitted from the second antenna or vice versa. Timing means setting appropriate transmit timing of signals transmitted on the diversity branches. Ideally the transmit timing of signals on all antennas should be the same. Hence the relative time should be as small as possible. Relative timing may comprise of the time difference between the transmitted timing of the signal transmitted from the first transmit antenna and the transmitted timing of the signal transmitted from the second antenna or vice versa. Therefore similar absolute timings are to be used on all transmit diversity branches. In that Absolute or total power is the total power transmitted from all transmit antennas.

Relative power and relative amplitude may also be expressed in linear scale, in which case they will be ratios of powers or signals from the transmit antennas.

Different types of uplink transmit diversity schemes or variants can be employed by using an appropriate algorithm for the adjustment of transmit diversity parameters. For instance transmit diversity parameters such as relative phase and amplitude can be adjusted to create transmit diversity beamforming. Similarly in case of 'switched antenna uplink transmit diversity' the output of the modulator is switched between the two transmit antennas by the UE such that the UE transmits using one antenna at a time. This corresponds to the fact that the diversity parameter such as amplitude or power from the other antenna(s) is zero. The invention is therefore applicable to any uplink transmit diversity scheme, in particular those utilizing some sort of control signals transmitted by the network in the downlink direction, which can be used for adjusting transmit diversity parameters.

Thus, an adjustment of the transmit diversity parameters can be based on one or more types of signals received by the UE from radio network node(s). Examples of signals are the: transmit power control (TPC) commands sent by the base station to the UE for controlling the uplink transmitted power of the UE, HARQ ACK/NACK sent by the base station to the UE for controlling HARQ retransmissions by the UE as well as any other explicit signaling for controlling or adjusting the UE transmit diversity parameters etc.

The following functionalities are elaborated down below:
Reliability Detection
UE Behavior for Reliability Handling
Yet another functionality that can be used is the UE indicating to the network that repeatedly received unreliable commands results or may result in an inappropriate derivation of uplink transmit diversity parameter:
Event reporting and network action It should be noted that in the subsequent sections, the embodiments are described for the uplink transmit diversity and in particular for the transmit beamforming and the switched antenna uplink transmit diversity schemes. However, the embodiments are applicable to any type of uplink transmit diversity scheme, which use some sort of downlink network control signaling for deriving the values of the uplink transmit diversity related parameters. Similarly the different methods that are described can be applied to any access technology notably GSM, WCDMA, cdma2000, LTE Frequency Division Duplex (FDD), LTE Time Division Duplex (TDD) or Universal Mobile Telecommunications System Terrestrial Radio Access Network (UTRAN) TDD etc.

As regards reliability detection, downlink signals such as Transmit power control (TPC) commands, HARQ ACK/NACK etc received by the UE are used by the UE to derive the values of the uplink transmit diversity parameters. Therefore these downlink control signals (or commands), which are sent by the network, reflect the uplink signal quality. However, these signals as received by the UE in the downlink may be erroneous due to poor downlink quality. For instance due to poor downlink quality, the UP TPC command (e.g. 1) sent by the network may be interpreted as DOWN (e.g. 0). Hence, on/off type signals without strong protection e.g. in the form of channel coding, which may be either '0' or '1' such as TPC, HARQ ACK/NACK etc are highly prone to reception errors.

A UE determines the reliability of the received signals before using them for deriving or adjusting the transmit diversity parameters or using them for any transmit diversity related action or decision.

In order to determine the reliability of a set of received signals, the UE may perform the steps of:
Receiving a set of downlink signals, which can be e.g. TPC commands or HARQ ACK/NACKs or similar signals transmitted by network node(s)
Measuring, estimating or deriving the downlink quality of the received signals, wherein the said downlink quality of the received signals or commands is based on any of the following: signal strength, SIR, SINR, bit error rate (BER) or symbol error rate of the said downlink received signal or of any suitable common or dedicated pilot signal, which can be mapped to the downlink quality. Examples of common pilot signals are common pilot channel (CPICH) and synchronization channel (SCH) in UTRAN or reference signal and SCH in LTE. Examples of dedicated pilots are the pilot symbols sent on dedicated physical control channel (DPCCH) in WCDMA or dedicated reference signal (DRS) in LTE.
Comparing the received signal quality of the signals or commands with a threshold to determine whether the downlink received signals are reliable or not. A received signal is reliable if its quality is above a threshold, otherwise it is unreliable. The threshold can be determined by the UE, pre-defined in the standard or signaled by the network to the UE.

Figure 3:
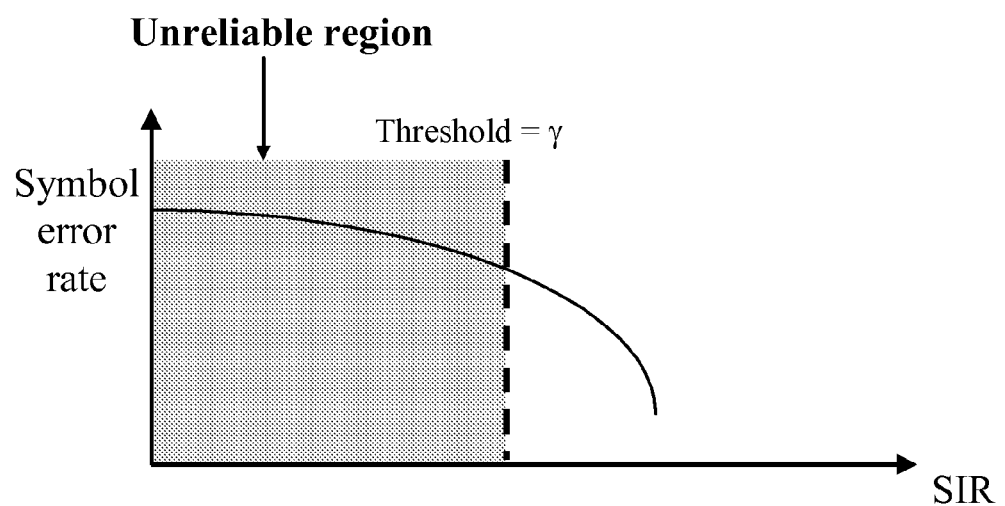
FIG. 3 illustrates the relation between the TPC SIR and TPC symbol error rate.

As an example FIG. 3 illustrates the relation between the TPC SIR and TPC symbol error rate. The UE measures the SIR of the received TPC bits and compares this with the threshold (y) to check whether the received TPC bits are unreliable or not. For instance in WCDMA, the UE can first measure SIR on the TPC commands sent over Fractional Dedicated Physical Channel (F-DPCH) and use a mapping function to derive the TPC command error rate. The target TPC error rate can be set to a suitable threshold level for example 30%, beyond which the command can be regarded as unreliable.

Regarding UE behavior for reliability handling, the UE can be adapted to use only the reliably received downlink signals for deriving the uplink transmit diversity parameter for any uplink transmit diversity decision such as antenna selection for uplink transmission.

Figure 4:
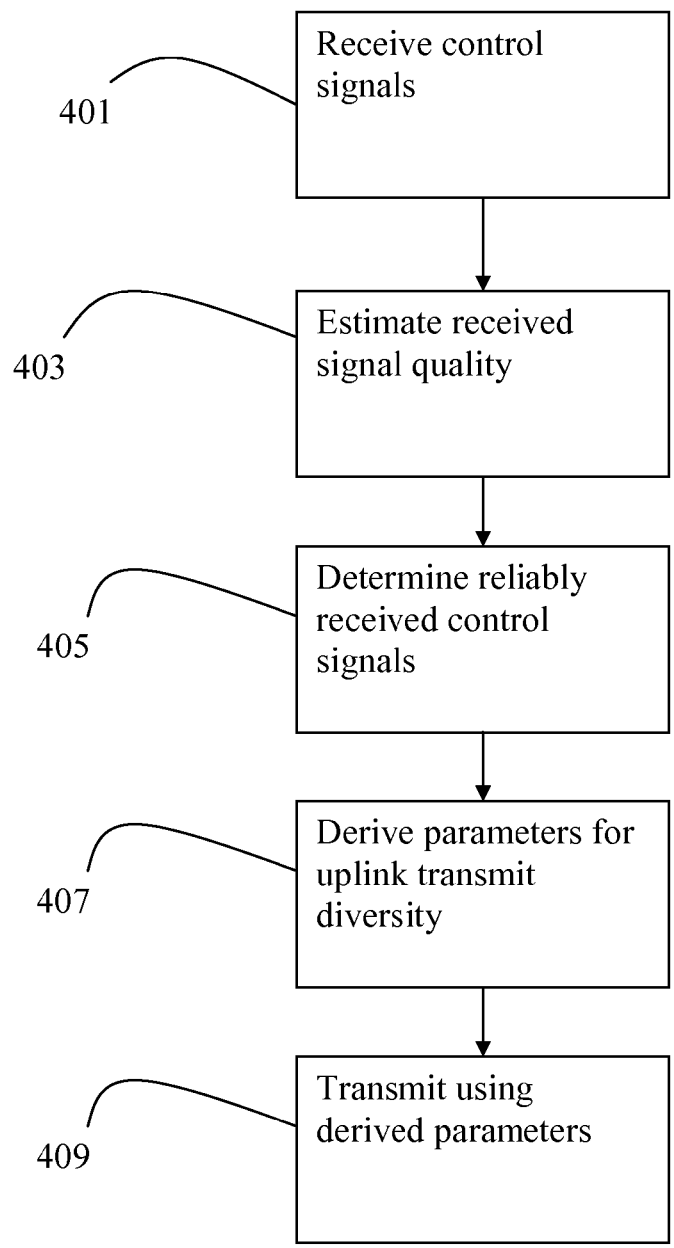
FIG. 4 is a flowchart illustrating some procedural steps performed when controlling uplink transmission in a user equipment.

In FIG. 4 a flowchart illustrating some steps performed when controlling uplink transmit diversity operation in a UE is depicted. The UE can be using at least two uplink transmit antennas. First, in a step 401, the UE receives a set of control signals in the downlink direction from a cellular network. The UE estimates a received signal quality for each control signal in said set of control signals in a step 403. Next, in a step 405 then determines, which control signals that have been reliably received based on the received signal quality. Thereupon, the UE derives one or more parameters related to the uplink transmit diversity operation using a subset of control signals from said set of control signals, said subset only including control signals determined as reliably received in a step 407. The UE then in a step 409 transmits in the uplink direction while applying the derived one or more parameters to control the uplink transmit diversity operation.

The UE behavior of handling the unreliable commands, most notably the TPC commands, for deriving the uplink transmit diversity parameters or for antenna selection can be specified in the applicable standard i.e. pre-determined rule(s) governing the UE behavior. Different criteria for the UE behavior of handling unreliable commands or control signals can be specified i.e. pre-determined rule(s).

For example, for any type of uplink transmit diversity, the criteria can be specified. as:

The UE shall use only reliable received commands (e.g. TPC or any explicit signaling for UL transmit diversity) for deriving or setting the uplink transmit diversity parameters used for uplink transmit diversity.

In case of transmit beamforming the criteria can be specified as:

The UE shall use only reliable received commands (e.g. TPC or any explicit signaling) for deriving or setting the uplink transmit diversity parameters used for uplink transmit beamforming.

In case of switched antenna transmit diversity the criteria can be specified as:

The UE shall use only reliable received commands (e.g. TPC or any explicit signaling) for selecting uplink antenna for uplink transmission in case of switched antenna transmit diversity.

Yet another criterion can be specified as:

The UE shall use only a single transmit antenna or shall not use uplink transmit diversity in case all received commands are unreliably received over a certain period.

The UE behavior depends on whether it receives signals or commands from a single radio link or multiple radio links. A radio link is a wireless link between the UE and a radio base station over which control information and/or data are exchanged between the UE and the radio base station. The radio base station can for example be a Node B in UTRAN, an eNode B in E-UTRAN, an access point or the like. Within the same site or location there may be more than one radio base station. Typically transmission and reception of data/control takes place using a single radio link. However in some cases like in soft handover multiple radio links are used for reception and transmission of data and control information.

In case of a single radio link, when the UE receives downlink signals or commands from only one radio link. The UE can perform a step of:

Using only the reliable downlink signals/commands such as TPC or HARQ ACK/NACK (i.e. whose quality is above threshold) for deriving or adjusting one or more uplink transmit diversity parameters such as relative phase, relative amplitude, relative power, relative frequency, timing, absolute or total power of signals transmitted on transmit diversity branches or for the selection of uplink transmit antenna.

According to one embodiment when the UE uses a window (W) comprising of a number N last received commands to derive the said uplink transmit diversity parameters, the UE can perform a further step of:

Using all M, M being a number equal or less than the number N (M≤N) reliably received signals/commands out of the last N total received signals/commands for deriving uplink transmit diversity parameters or for the selection of uplink transmit antenna.

In case all N last received commands are unreliable, then the UE can perform a further step of:

Using only a single transmit antenna for uplink transmission until

The expiry of time period (T0), which can either be determined by the UE or be a pre-defined value or be signaled by the network; or At least one received command out of the last N received commands becomes reliable.

According to another embodiment, if all N last received commands are unreliable then the UE can perform the steps of:

Extending the size of the window (W) of last received commands to a number L, where L is larger than the number N (L>N) for deriving the uplink transmit diversity parameters.

Reducing the size of the said window to the pre-defined or default value when at least a number K commands out of L commands are reliably received.

In case of multiple radio links, the UE receives downlink signals or commands from more than one radio link. Each radio link connects the UE to a different cell, which may or may not belong to the same base station site. This is the case of soft handover in CDMA systems e.g. WCDMA or cdma2000. Another example is that of coordinated multipoint transmission and reception (CoMP), which allows the UE to receive and transmit data over multiple radio links. The CoMP can be employed in various technologies including WCDMA and LTE.

In such a case with multiple radio links, the UE can perform a step of:

Using only the reliable downlink commands such as TPC or ACK/NACK (i.e. whose quality is above threshold) from each radio link (or in other words using only the reliable radio link(s)) for deriving or adjusting one or more uplink transmit diversity parameters such as relative phase, relative amplitude, relative power, relative frequency, timing, absolute or total power of signals transmitted on transmit diversity branches or for the selection of uplink transmit antenna.

According to one embodiment, when the UE uses a window (W) comprising of N last received commands from each radio link to derive the said uplink transmit diversity parameters, the UE can perform a step of:

Using all M (M≤N) reliably received commands from each radio link out of the last N total received commands from each radio link for deriving uplink transmit diversity parameters or for the selection of uplink transmit antenna.

In case all N last received commands from all the radio links are determined to be unreliable, then the UE can perform a step of:

Using only a single transmit antenna for uplink transmission until

The expiry of time period (T0), which can either be determined by the UE or be a pre-defined value or be signaled by the network; or At least one received command out of the last N received commands from at least one radio link becomes reliable.

According to one embodiment if all N last received commands from all the radio links are determined to be unreliable then the UE can perform the further steps of:

Extending the size of the window (W) of last received commands to L (L>N) of all the radio links for deriving the uplink transmit diversity parameters Reducing the size of the said window to the pre-defined or default value when at least K commands out of L commands for at least one radio link are reliably received.

The UE can be adapted to ignore unreliable commands to prevent errors in adjusting the transmit diversity parameters. If the received commands are frequently unreliable, then this may lower the performance of uplink transmit diversity. The network should preferably be informed (or otherwise detect) when this happens and take appropriate action to remedy the situation.

Hence, according to one embodiment, the UE can be adapted to explicitly report to the network when over a period of time the UE is unable to appropriately derive the transmit diversity parameters due to unreliable downlink, which causes unreliably received commands. This error condition can be reported by the UE to the network in the form of network configured events. The event parameters such as duration (T1) over which certain transmit diversity parameters (P) cannot be properly adjusted can be configured by the network or can also be pre-defined.

In response to event reporting the network can take appropriate action. Such actions include increasing the transmit power level, congestion control to reduce interference or in the worst case cell change etc. This information can also be used for operational and maintenance purposes, i.e. for long term network planning to set correct transmission power levels, cell size dimensioning etc.

Furthermore, the network can be adapted to also use the UE reported event (or any relevant error condition regarding the setting of parameters due to poor downlink quality) to turn off the transmit diversity altogether by requesting the UE to go to fallback mode i.e. single transmit antenna transmission mode.

Event reporting as described above explicitly notifies the network about the status of inappropriate setting of parameters for the uplink transmit diversity due to unreliable received commands. But this involves some signaling overhead due to the event reporting in the uplink. As another alternative, the network can itself infer that the uplink transmit diversity parameters are not correctly set without any explicit UE reports or any event reporting.

As an example in case of beamforming, if the beam direction of the received beam at the base station deviates by a certain threshold, then the network can increase the transmit power of the downlink transmitted signals or commands. Another possibility is that the network turns of the transmit diversity. Yet another possibility is that the network performs handover. The handover to another cell may ensure better downlink quality, which in turn will improve the reliability of the downlink received command at the UE.

Similarly due to improper beam directivity the neighboring base station may receive higher interference. Based on the uplink cell load (e.g. served users) and network planning knowledge (e.g. statistics of interference), the base station can identify whether the interference is normal or due to specific cause such as inappropriate beamforming. Such a base station can also inform neighboring base stations about the expected interference from their served users.

In accordance with one embodiment a method in a cellular network for interacting with a UE capable of performing uplink transmission using an uplink transmit diversity operation scheme is provided. In accordance with the method a command signal is transmitted to the UE, said command signal ordering the UE to report to the network when the UE for a defined period of time has failed to appropriately derive one or more parameters related to the uplink transmit diversity operation from control signals received by the UE in the downlink direction from the network, the failure to appropriately derive said parameters due to low received signal quality of said control signals as received by the UE. The network receives a report from the UE that it has failed to appropriately derive one or more parameters related to the uplink transmit diversity operation for the defined period of time.

In accordance with one embodiment the receipt of the report from the UE triggers the network to perform at least one out of:
  increasing transmit power in the downlink;
  adapting congestion control to reduce downlink interference;
  ordering the UE to change cell e.g. by performing handover;
  ordering the UE to use single antenna uplink transmission.

In accordance with one embodiment the command signal from the network to the UE and the report from the UE to the network are transmitted using a radio resource control protocol.

Further, in accordance with another embodiment a method in a cellular network for interacting with a UE performing uplink transmission using an uplink transmit diversity operation scheme is provided. In accordance with the method, the network monitors uplink transmissions from the UE for detecting events indicative of the UE potentially having failed to appropriately derive one or more parameters related to the uplink transmit diversity operation from control signals received by the UE in the downlink direction from the network.

In accordance with one embodiment the uplink transmit diversity operation scheme is beamforming and wherein the events include at least one of:
  received beam direction deviating from an expected direction by more than a certain threshold;
  higher than expected received interference at a neighboring base station.

The methods and user equipments as described herein will improve the accuracy of the transmit diversity parameter values derived/set by the UE. This will enhance the performance of the uplink transmit diversity and will also reduce interference to the neighbor cells. Also, the UE event reporting or independent detection at the network of the unreliable reception of the downlink signals at the UE, will enable the network to take appropriate action (e.g. adjusts transmit power etc). As a consequence of the network taking actions to improve the downlink, the accuracy of the transmit diversity parameter values set by the UE can be improved. This will enhance the performance of the uplink transmit diversity and will also reduce interference to the neighbor cells.

The invention claimed is:

1. A method in a user equipment for controlling uplink transmit diversity operation, where the user equipment transmits using at least two uplink transmit antennas, the method comprising:
  receiving a set of control signals in the downlink direction from a cellular network;
  estimating a received signal quality for each control signal in said set of control signals;
  determining, based on said received signal qualities, which control signals have been reliably received;
  deriving one or more parameters related to the uplink transmit diversity operation using a subset of control signals from said set of control signals, said subset only including control signals determined as reliably received; and
  transmitting in the uplink direction while applying the derived one or more parameters to control the uplink transmit diversity operation.

2. The method of claim 1, wherein the control signals include one or more of the following types of control signals:
- transmit power control commands sent to the user equipment for controlling uplink transmit power of the user equipment;
- Hybrid Automatic Repeat Request (HARQ) Acknowledgement/Negative Acknowledgement (ACK/NACK) signals sent to the user equipment for controlling HARQ retransmissions by the user equipment;
- control signals for explicit control of the user equipment transmit diversity parameters.

3. The method of claim 1, wherein the received signal quality is estimated based on one or more of the following:
- Signal to interference ratio (SIR);
- Signal to interference plus noise ratio (SINR);
- bit error rate;
- block error rate;
- SDU error rate;
- Frame error rate;
- symbol error rate.

4. The method of claim 1, wherein the one or more parameters comprise one or more of the following:
- relative phase;
- relative power;
- relative frequency;
- timing;
- relative amplitude;
- absolute power;
- of signals transmitted on transmit diversity branches.

5. The method of claim 1, wherein if no control signal in said set of control signals is determined as reliably received, the user equipment performs uplink transmissions using less than all transmit antennas in said set of at least two uplink transmit antennas.

6. The method of claim 1, wherein if no control signal in said set of control signals is determined as reliably received, the user equipment switches to a single transmit antenna transmission mode in which uplink transmissions are performed using a single antenna in said set of at least two uplink transmit antennas.

7. The method of claim 1, wherein if the set of control signals consists of a number of N control signals out of which less than a number of M control signals are determined as reliably received, M<N, the user equipment performs uplink transmissions using less than all transmit antennas in said set of at least two uplink antennas.

8. The method of claim 1, wherein if the set of control signals consists of a number of N control signals out of which less than a number of M control signals are determined as reliably received, M<N, the user equipment switches to a single transmit antenna transmission mode in which uplink transmissions are performed using a single antenna in said set of at least two uplink transmit antennas.

9. The method of claim 1, wherein the user equipment is connected with multiple radio links and where the user equipment receives downlink signals or commands from more than one radio link, the method further comprising using only downlink commands whose quality is above threshold from each radio link for deriving or adjusting one or more uplink transmit diversity parameters.

10. The method of claim 1, wherein the user equipment explicitly notifies the network about the status of inappropriate setting of parameters for the uplink transmit diversity due to unreliable received commands.

11. A user equipment arranged to control uplink transmit diversity operation, the user equipment comprising:
- at least two uplink transmit antennas;
- controller circuitry arranged to receive a set of control signals in the downlink direction from a cellular network;
- controller circuitry arranged to estimating a received signal quality for each control signal in said set of control signals;
- controller circuitry arranged to determine, based on said received signal qualities, which control signals that have been reliably received;
- controller circuitry arranged to derive one or more parameters related to the uplink transmit diversity operation using a subset of control signals from said set of control signals, said subset only including control signals determined as reliably received; and
- controller circuitry arranged to transmit in the uplink direction while applying the derived one or more parameters to control the uplink transmit diversity operation.

12. The user equipment of claim 11, wherein the control signals includes one or more of the following types of control signals:
- transmit power control commands sent to the user equipment for controlling uplink transmit power of the user equipment;
- Hybrid Automatic Repeat Request (HARQ) Acknowledgement/Negative Acknowledgement (ACK/NACK) signals sent to the user equipment for controlling HARQ retransmissions by the user equipment; and
- control signals for explicit control of the user equipment transmit diversity parameters.

13. The user equipment of claim 11, wherein controller circuitry for estimating a received signal quality is arranged to estimate the received signal quality based on one or more out of:
- Signal to interference ratio (SIR);
- Signal to interference plus noise ratio (SINR);
- bit error rate;
- block error rate;
- SDU error rate;
- Frame error rate;
- symbol error rate.

14. The user equipment of claim 11, wherein the one or more parameters comprise one or more of the following:
- relative phase;
- relative power;
- relative frequency;
- timing;
- relative amplitude;
- absolute power;
- of signals transmitted on transmit diversity branches.

15. The user equipment of claim 14, wherein the uplink transmit diversity operation is transmit diversity beamforming and the one or more parameters comprise relative phase and amplitude of signals transmitted on transmit diversity branches.

16. The user equipment of claim 14, wherein the uplink transmit diversity operation is switched antenna uplink transmit diversity and the one or more parameters comprise amplitude or power of signals transmitted on transmit diversity branches.

17. The user equipment of claim 11, wherein the user equipment is arranged to perform uplink transmissions using less than all transmit antennas in said set of at least two uplink transmit antennas if no control signal in said set of control signals is determined as reliably received.

18. The user equipment of claim 11, wherein the user equipment is arranged to switch to a single transmit antenna transmission mode in which uplink transmissions are performed using a single antenna in said set of at least two uplink transmit antennas if no control signal in said set of control signals is determined as reliably received.

19. The user equipment of claim 11, wherein the user equipment is arranged to perform uplink transmissions using less than all transmit antennas in said set of at least two uplink antennas if the set of control signals consists of a number of N control signals out of which less than a number of M control signals are determined as reliably received, M<N.

20. The user equipment of claim 11, wherein the user equipment is arranged to switch to a single transmit antenna transmission mode in which uplink transmissions are performed using a single antenna in said set of at least two uplink transmit antennas if the set of control signals consists of a number of N control signals out of which less than a number of M control signals are determined as reliably received, M<N.

21. The user equipment of claim 11, wherein the user equipment connectable with multiple radio links and where the user equipment is adapted to receive downlink signals or commands from more than one radio link, the user equipment comprising:
  controller circuitry arranged to use only downlink commands whose quality is above threshold from each radio link for deriving or adjusting one or more uplink transmit diversity parameters.

22. The user equipment of claim 11, wherein the user equipment is configured to explicitly notify the network about the status of inappropriate setting of parameters for the uplink transmit diversity due to unreliable received commands.

* * * * *